July 31, 1923.
T. H. FURMAN
SAFETY DEVICE FOR AIRPLANES
Filed July 16, 1918
1,463,464
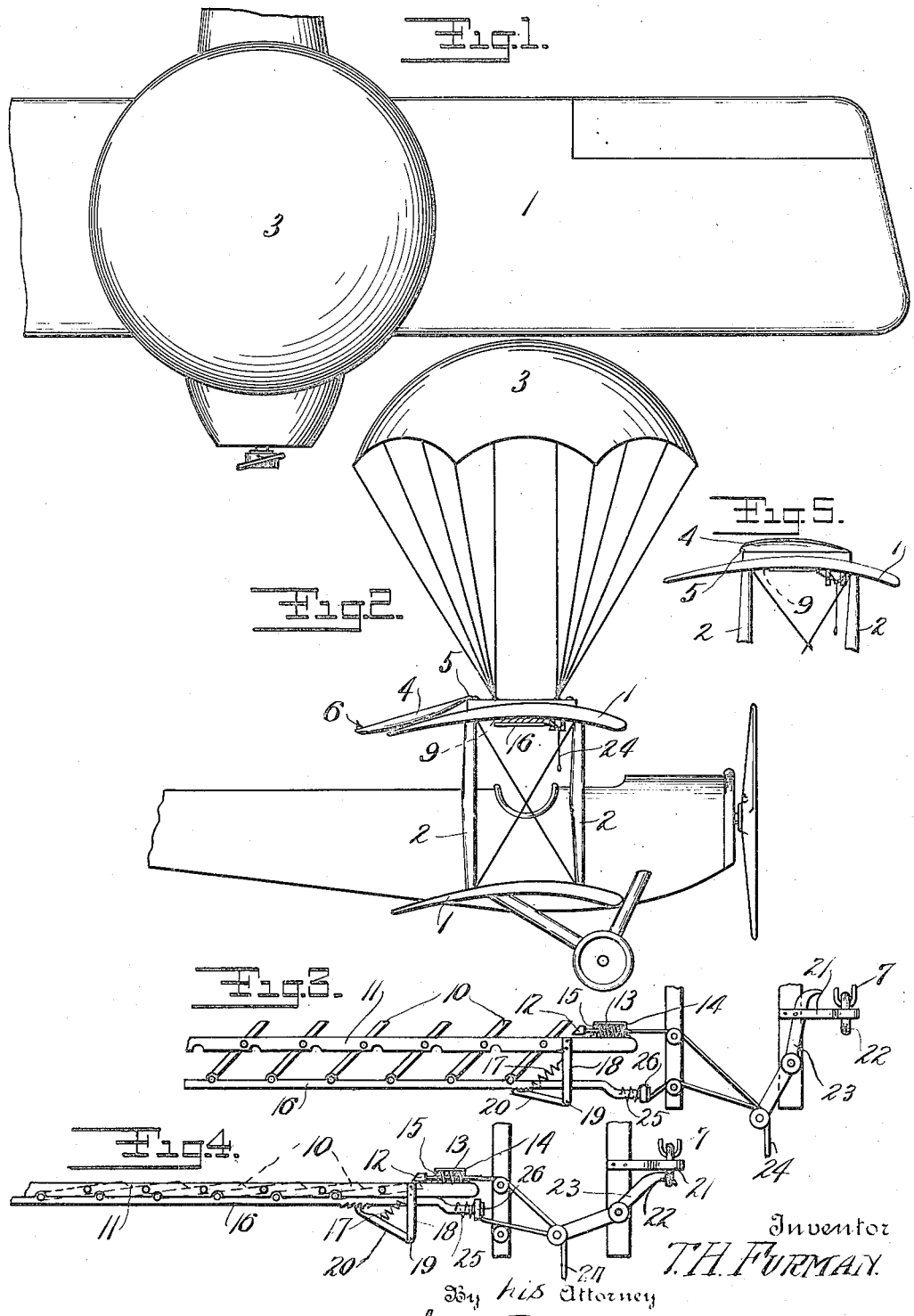

Patented July 31, 1923.

1,463,464

UNITED STATES PATENT OFFICE.

THOMAS HUNT FURMAN, OF BROOKLYN, NEW YORK.

SAFETY DEVICE FOR AIRPLANES.

Application filed July 16, 1918. Serial No. 245,143.

*To all whom it may concern:*

Be it known that I, THOMAS H. FURMAN, citizen of the United States, and resident of Brooklyn, in the county of Kings and State of New York, have invented certain new and useful Improvements in Safety Devices for Airplanes, of which the following is a specification.

My invention pertains to improvements in devices for insuring the safety of an airplane and preventing the death of the aviator and the destruction of the airplane in case of accident such as would ordinarily cause the airplane when in flight to plunge downward to the surface of the earth.

The principal object of my invention is to provide a device which will efficiently serve the above mentioned purpose and yet be simple in construction, compact in form and capable of being easily and quickly applied to an airplane without being burdensome or in any way interfering with the operation of the airplane; and which further will be adapted to be operated instantly to afford the desired result, whenever the emergency arises.

The above and other objects of my invention will fully appear in the following description, taken in connection with the accompanying drawings, in which a preferred form or embodiment of my invention is illustrated. This disclosure, however, is explanatory only, and I may resort to changes in what is actually set forth herein; particularly with reference to the shape, size and arrangement of the parts of my preferred construction, within the scope and spirit of my invention, as the same is embraced within the general meanings of the terms of the claims hereto appended.

On the drawings Figure 1 is a plan view and Fig. 2 is a front elevation showing conventionally an airplane with a construction embodying a parachute as an element of my invention attached to it, and illustrating how the airplane is prevented from falling by use of my invention.

Figs. 3 and 4 show in side elevation in respective open and closed positions mechanism employed in unfurling the parachute element; and Fig. 5 is a partial view of parts closed which are shown open in Fig. 2.

Referring first to Figs. 1 and 2 of the drawings, I show an airplane having wings 1 connected by a framework including vertical members 2 which may be arranged at the front and back of the airplane; and attached to the top of the airplane is a parachute 3 which when extended will prevent the airplane from falling to the ground and being destroyed in case any mishap occurs to the propeller or engine or any other part of the mechanism necessary to maintain the machine in the air. The parachute will be applied to the top of the machine and when there are two wings indicated at 1 it will be disposed normally on the upper surface of the topmost wing. When not needed this parachute will be collapsed and disposed under a cover 4 which can be automatically removed to allow the parachute to open and become distended whenever occasion requires. Although I show my invention applied to a biplane, I may use it on any airplane having a smaller or larger number of wings as well.

The parachute 3 may be secured by cords or ropes to the top of the airplane and when it is collapsed it will be completely masked by the cover 4 indicated in Figs. 2 and 5. This cover may be of sheet metal or of other material such as canvas, in which latter case it will be attached preferably to a spring roller 5 mounted in bearings on the top of the airplane and when the cover is liberated the spring roller will act in the manner of an ordinary window shade roller to wind it up so as to draw it off from the top of the airplane and allow the parachute to be forced upward and distended by the pressure of air from below.

A roller 5 may extend transversely of the airplane as shown, or it may extend longitudinally. In any case the cover 4 will be so patterned that it bellies upward, being in fact given the shape of a shallow bag or pouch so that when it is drawn over the parachute 3 longitudinally the edges of this cover will lie over the top of the wing 1. The free end of the cover may be attached to a staple 6 and which may have a ring 7 to hold the cover in the position shown in Fig. 4. When the ring 7 is released the spring roller 5 is free to wind up the cover and enable the parachute to take its opened up form as shown in Figs. 1 and 2. If desired the top of the airplane may be provided with guideways in which the longitudinal edges of the cover may be disposed and be free to move and a shield or screen may be added to the top of the airplane in front of the roller 5 when this roller is in transverse position, this screen curving upward slightly over the roller and having such shape as to conform in general contour to the upper surface of the wing 1 upon which the roller is mounted, so as to diminish any head-on resistance which the presence of this roller might create.

In the wing 1 below the point at which the parachute is attached, which will preferably be in the middle of the airplane as Fig. 1 indicates, I would provide an opening 9, and this opening will ordinarily be closed by a number of parallel shutters 10 which in the present form are shown as extended transversely to the airplane. The shutters are all pivoted to members 11 which are secured to the framework of the airplane and when they close the opening 9 the forward shutter is shown in position to be engaged by a latch 12. This latch normally prevents the opening of the shutters and thus cuts off any air pressure through the opening 9 against the parachute under the cover 4. When the machine is operating under proper conditions the catch 12 comprises both a head and a shank, the latter supporting a spiral spring 13 which impels the catch in such direction that it will be held in engaging position over the forward rearmost shutter 10 and hold these shutters closed as above stated. The spiral spring 13 is located in a casing 14 fixed to one of the members 11 bearing against an end of the casing which will be closed for the purpose. Thus it will be seen that this catch can be drawn rearward until the head thereof is stopped by this forward end. The spring 13 in the casing 14 bears against the enclosed end of the casing at one extremity and against the collar or projection 15 on the shank of the catch 12 at its other extremity. The shank of the catch extends through a central orifice in the casing 14 and the end of the shank has an eye to enable it to be attached to the cord or rope for operating it. The shutters are all operably connected to a rod 16 having ratchet teeth 17 and to one of the members 11 will be fixed an arm 18 having pivotally attached thereto on the pin 19 a catch 20 which when the rod 16 is pulled to open the shutters, will engage successively the teeth 17 of the rack upon the under surface thereof and prevent return movement of the rod so as to keep the shutters open (see Fig. 3). Hence when the catch 12 is actuated so as to disengage itself from the rear shutter 10 and the rod 16 is caused to open the shutters, the opening 9 will be exposed and if the cover 4 be withdrawn simultaneously by the roller 5 the pressure of the air can then be exerted through the opening 9, if the airplane is falling, to distend the parachute and avert disaster.

The means for releasing the cover 4 in suitable timing with the opening of the shutters 10 comprises a mechanism attached to the framework of the airplane having a guide 19 which may consist of a piece of metal bent into the form shown in Figs. 3 and 4. This piece of metal will have an arm curved so as to make in effect a slot 22 at the outer end thereof for receiving the ring 7. When the ring 7 attached to the staple 6 passes downward through the slot 22 it can be engaged by the hook 23 pivoted to the bell lever 23ª suitably mounted upon the pivot 23ᵇ projecting from the portion of the frame supporting the guide 21 and arranged to have its upper end underneath the guide 21. When the hook 23 engages the ring which holds the cover 4 over the parachute and when the hook is operated so that its end passes through the ring 7 which enters the slot 22 of the guide 21, the ring 7 is disengaged and the cover 4 can be withdrawn. A rod 24 is fixed to the opposite end of the hook which is in the form of a lever and this end may be attached by other cords to both the catch 12 and the rod 16. A spring 25 may be inserted in the cord leading to the rod 16 so as to make the connection between this rod and the hook 24 a yielding one, the guide rollers over the cords leading to the catch 12 and rod 16 being placed on the framework of the airplane in any convenient position.

When flying the cover 4 will lie over the parachute 1 which will be collapsed against the top of the airplane and ring 7 will be engaged by the hook 23 and all the shutters 10 will be closed so as to obstruct the opening 9. In case of accident which causes the machine to fall, the operator has only to pull on the rod 24 so as to disengage the hook 23 and draw back the catch 12 to release the shutters 10. As soon as the shutters are released the same pull takes effect through the spring 25 to actuate the bar 16 and open the shutters. As soon as the shutters are opened the upward pressure of the air distends the parachute and by this time the cover 4 has been wound up on the roller 5 and is thus entirely out of the way. The airplane therefore sinks easily to earth and the machine can be saved even should the nature of the accident be such as to destroy one or both wings and make it impossible for the aviator to make his descent by volplaning.

The canvas and its spring roller mechanism are shown as a complete detail of the means employed for protecting the folded parachute from the action of the wind. It is obvious that the cover 4 alone will for all practical purposes accomplish the object of the cover and canvas combined. Accordingly I do not wish to be confined to the exact construction of this feature of the mechanism as shown.

Having described my invention, what I claim and desire to secure by Letters Patent is:

1. The combination of an airplane having an opening in its top, a parachute attached thereto immediately over said opening and a cover for said parachute with means for locking said cover and manual means for releasing said locking means, said locking means comprising slats normally forming a part of the supporting plane of said airplane.

2. An airplane having an opening in its top, a parachute attached to the airplane above the opening, a cover for the parachute, a spring roller for withdrawing the cover, a catch for holding the cover in position over the parachute, one or more shutters for closing the opening, a catch for engaging one of said shutters, a rod connecting to said shutters, said rod and said hook being connected together, whereby when the hook is operated to release the cover, the shutters will also be released and moved to expose the opening, whereby air pressure through said opening in case the machine is falling can distend the parachute.

3. An airplane having an open section provided with axially supported slats disposed normally edge to edge so as to form a continuous plane, means for holding in said normal arrangement and for feathering said slats, a parachute secured to said airplane and adapted to be opened by air pressure applied thereto from below, and means comprising a cover for holding said parachute in closed form immediately over said slats.

Signed at New York, in the county of New York and State of New York.

THOMAS HUNT FURMAN.